LOGICAL CIRCUITS EMPLOYING SATURABLE CORE INDUCTORS

Filed Sept. 25, 1957 6 Sheets-Sheet 1

BISTABLE

PULSE SHAPER

JAMES J. NYBERG
INVENTOR.

BY ELWOOD S. KENDRICK
Lester S. Hecht

ATTORNEYS

Dec. 3, 1963 J. J. NYBERG 3,113,216

LOGICAL CIRCUITS EMPLOYING SATURABLE CORE INDUCTORS

Filed Sept. 25, 1957 6 Sheets-Sheet 2

OPERATION OF EMBODIMENT OF FIG. 1a.

JAMES J. NYBERG
INVENTOR.

BY ELWOOD S. KENDRICK

ATTORNEYS

JAMES J. NYBERG
INVENTOR.
BY ELWOOD S. KENDRICK
[signature]
ATTORNEYS

Dec. 3, 1963 J. J. NYBERG 3,113,216

LOGICAL CIRCUITS EMPLOYING SATURABLE CORE INDUCTORS

Filed Sept. 25, 1957 6 Sheets-Sheet 4

JAMES J. NYBERG
INVENTOR.

BY ELWOOD S. KENDRICK
Lester S. Hecht

ATTORNEYS

LOGICAL CIRCUITS EMPLOYING SATURABLE CORE INDUCTORS

Filed Sept. 25, 1957 6 Sheets-Sheet 5

JAMES J. NYBERG
INVENTOR.

BY ELWOOD S. KENDRICK
Lester S. Hecht

ATTORNEYS

LOGICAL CIRCUITS EMPLOYING SATURABLE CORE INDUCTORS

Filed Sept. 25, 1957 6 Sheets-Sheet 6

JAMES J. NYBERG
INVENTOR.
BY ELWOOD S. KENDRICK
[signature]
ATTORNEYS

United States Patent Office 3,113,216
Patented Dec. 3, 1963

3,113,216

LOGICAL CIRCUITS EMPLOYING SATURABLE CORE INDUCTORS

James J. Nyberg, Torrance, Calif., assignor, by mesne assignments, to Thompson Ramo Wooldridge Inc., Cleveland, Ohio, a corporation of Ohio Filed Sept. 25, 1957, Ser. No. 686,246
10 Claims. (Cl. 307—88)

This invention relates to circuits including saturable core inductors and transformers, and more particularly to magnetic circuits capable of transforming pulse input thereto and also capable of having two states of saturation which may represent the bilevel signals of digital computers.

The invention has been found particularly useful in what is conventionally called a magnetic trigger circuit, flip-flop, or bistable multivibrator. Other applications are in circuits for forming such computer functions as logical "and" or logical "or." The prior art has developed various types of magnetic logical circuits and typical devices are found in the following patents: Walsh, 2,603,771; McCreary, 2,611,120; Steagall, 2,709,798; Schmitt, 2,713,674; Schmitt, 2,713,675; Ramsey, Jr., 2,717,965; Montner, 2,747,109; Talambiras, 2,749,451; and Grayson, 2,770,739.

An examination of these patents and other typical prior art reveals several characteristics. Firstly, most of the known circuits require a continuous input of alternating current of a frequency considerably higher than that corresponding to the basic timing ("clock") period of a computer. Other circuits are noted which require accurate control of input pulse combinations for reliable triggering or may necessitate more than one saturable core inductor or transformer, and/or require additional components such as non-linear elements. Typical prior art arrangements of this type are shown in the following patents: Isborn, 2,778,955, 2,723,354; Melville, 2,869,004; Sunderlin, 2,883,563; and Australian Patent No. 216,131 issued June 30, 1957.

The present invention overcomes these and other disadvantages of the prior art by providing, in its simplest embodiment, a circuit arrangement having a pair of inductors, one of which is wound as a saturable magnetic core inductor, as its basic elements. Energy transfer is accomplished between the saturable inductor and the other inductor in one of two manners, depending on the specific circuit arrangement.

In one arrangement in which two parallel current paths are employed in which a non-saturable and saturable core inductor are connected an input pulse causes the saturable inductor to change state as the inductor accumulates energy in the form of a magnetic field. When the input pulse dissipates, the field collapses and the inductor releases its energy to the saturable inductor in a manner such as to cause the latter to be restored to its original state. This arrangement produces an output for each "switch" of the saturable inductor and thus the output pulse repetition rate is twice that of the input. This, then, comprises a pulse-shaping circuit.

In another arrangement of the invention, an energy storage device, such as a capacitor or delay line, is introduced into the circuit in association with the saturable inductor. This arrangement exhibits a "memory" feature in that the capacitor receives a charge in one polarity when an input pulse causes the saturable inductor to stabilize in a first state and subsequently receives a charge in the opposite polarity when the saturable inductor switches to the opposite state.

The "memory" characteristic of the capacitor or other storage device, then, either aids or opposes the change of state of the saturable inductor, depending on prior condition of saturation. Each input pulse applied to the circuit causes the saturable core to assume an alternate stable state. This arrangement may therefore be designated as a flip-flop. The flip-flop may be provided with a single input to change its state each time a pulse of the same polarity is received. However, if desired, two other inputs may be employed to set the flip-flop to "true" or "false" states, selectively.

It is an advantage of the invention that a double frequency alternating output voltage is provided from a pulse-shaping network in one embodiment of the invention. In accordance with the embodiment of the invention including a magnetic flip-flop, a single voltage pulse of a substantial magnitude is also produced when the flip-flop changes states. The pulse is of one polarity and occurs at the leading edge of an applied pulse when the flip-flop changes to one state. The pulse is of the opposite polarity at the trailing edge of the input pulse when the flip-flop changes to its other state. Whether the output pulse is produced at the leading edge and has the one polarity or is produced at the trailing edge and has the opposite polarity will depend upon whether the saturable core inductor is changed from its "false" to "true" state or from its "true" to "false" state. Thus, the magnetic flip-flop of the invention may be usefully employed as an information storage device while it is actually being triggered. This is an advantage of this embodiment of the invention because storage is desirable in computer applications. For example, if it is necessary to perform a computer function when the flip-flop of the invention changes from the "false" to the "true" state and another when it changes from a "true" to a "false" state, voltage pulses at the output of the magnetic flip-flop may be separated according to their polarity and utilized to perform such functions.

It is an object of the invention to provide a simple and stable pulse-shaping circuit especially economical with respect to the number and complexity of components.

A further object of the invention is to provide a simple magnetic flip-flop circuit, adaptable to be triggered at either one or two input terminals.

Yet another object of the invention is to provide a magnetic trigger circuit which may be operated with or without additional gating or saturation state setting circuits.

Still a further object of the invention is to provide an economical magnetic trigger circuit for producing output pulses when it is triggered by signals having polarities corresponding to its prior state.

Another object of the invention is to provide a magnetic trigger circuit providing information storage as to its prior state by producing output pulses of different polarities depending upon whether it has been changed from a "false" to a "true" state or from a "true" to a "false" state.

The features of this new invention which are believed to be novel and patentable are pointed out in the claims which form a part of this specification. For a better understanding of the invention, reference is made in the following description of the accompanying drawings, wherein like parts are indicated by like reference numbers in which:

FIG. 1*a* is a schematic diagram of a pulse-shaping circuit constructed in accordance with the invention;

FIG. 1*b* is a schematic diagram of a flip-flop constructed in accordance with the invention;

FIGS. 2*a* and 2*b* are sets of waveforms illustrating the basic operation of the invention;

FIG. 2*c* shows hysteresis characteristic for an ideal saturable core inductor and an ideal inductor;

Figure 1B:
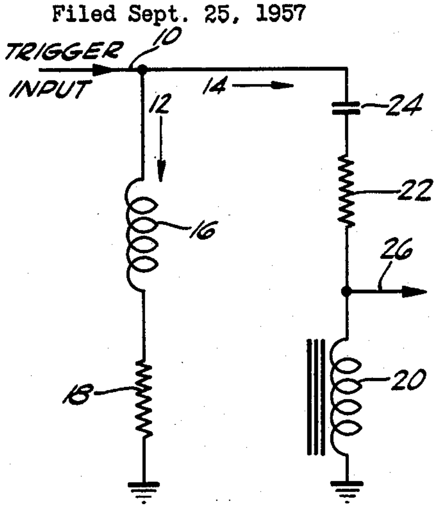
Figure 1A:
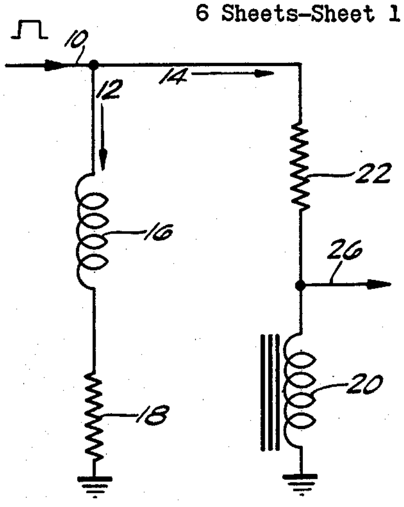

Reference is now made to FIGS. 1*a* and 1*b* where the invention is shown in simple arrangements illustrating its basic principles.

The pulse-shaped configuration of FIG. 1*a* comprises two current paths 12 and 14 connected in parallel between input line 10 and ground. Path 12 includes an air core inductor 16 and a resistance 18 connected serially, and path 14 includes a saturable core inductor 20 and a resistance 22 also connected serially. Output pulses may be derived from the circuit through lead 26.

It may be pointed out that, although resistors 18 and 22 are shown as circuit components, in practice it may be found that the internal resistances of inductors 16 and 20 will suffice in this embodiment as well as embodiments to be described. As will be shown, the prime consideration is a correct circuit time constant, the means used to provide therefor being of secondary importance.

The bistable configuration of FIG. 1*b* is similar in construction to that of FIG. 1*a* but includes a capacitor 24 connected serially in path 14. The operation of these two circuits will be illustrated with reference to FIGS. 2*a*, 2*b* and 2*c* which present idealized waveforms and the magnetic characteristic of inductors 16 and 20.

The discussion which follows will presume a square wave voltage input signal on line 10, but it will be obvious to those familiar with the art that no limitation is intended in this respect; the circuit is operative for other input wave shapes, such as trapezoidal or triangular, for instance. It is required, however, that the elements in the paths 12 and 14 store energy during the time that they are excited by the input voltage and that they be capable of discharging this energy during a subsequent time when the input voltage is not present. It follows that the time constants for each of the paths 12 and 14 preferably be short with reference to the period of the input wave shape.

It may also be pointed out that, although the input on line 10 to the circuits of FIGS. 1*a* and 1*b* will be shown as a voltage, the input is preferably from a high impedance source ("current" generator) in order that line 10 presents an open circuit to paths 12 and 14 when input current is not generated.

Figure 2C:
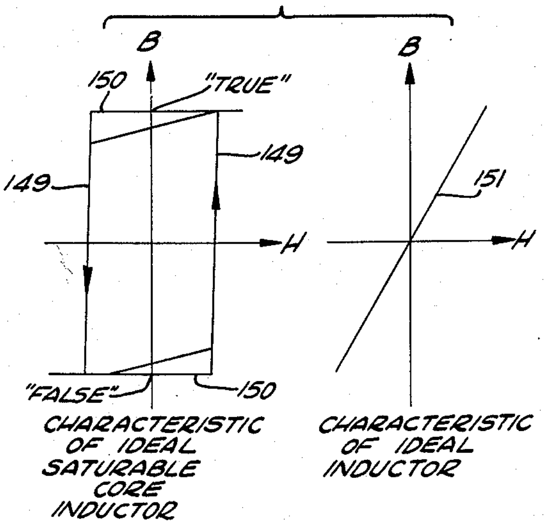
Figure 2A:
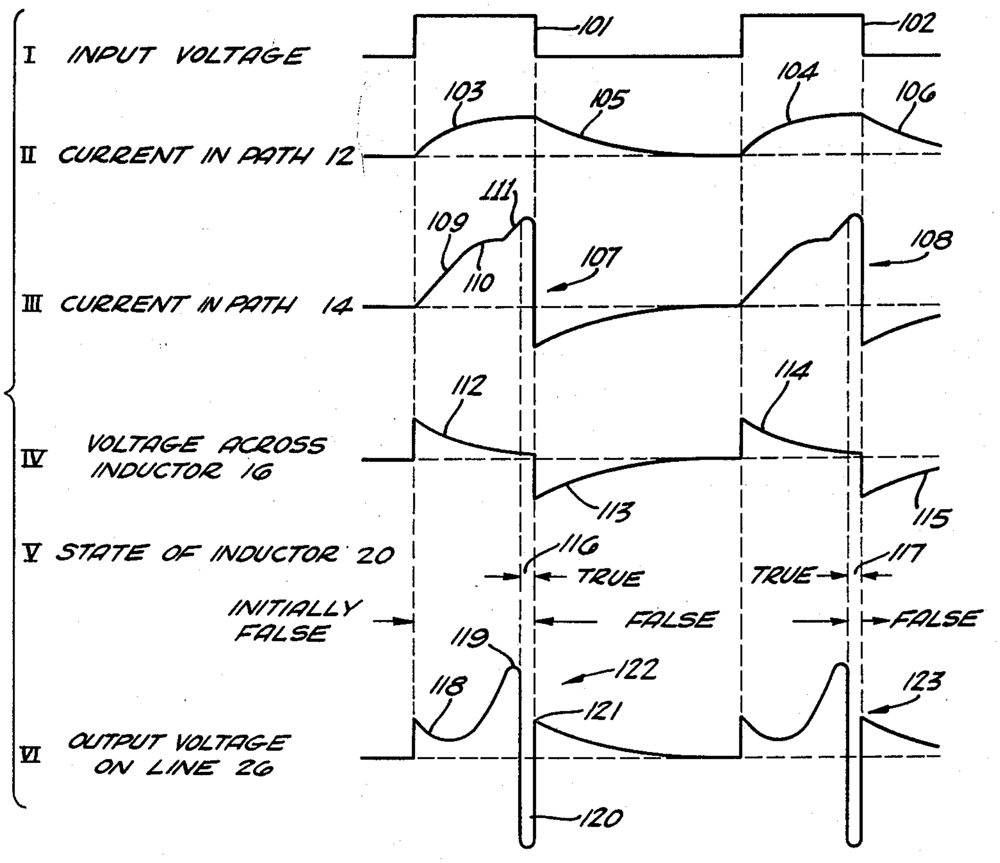
Figure 2B:
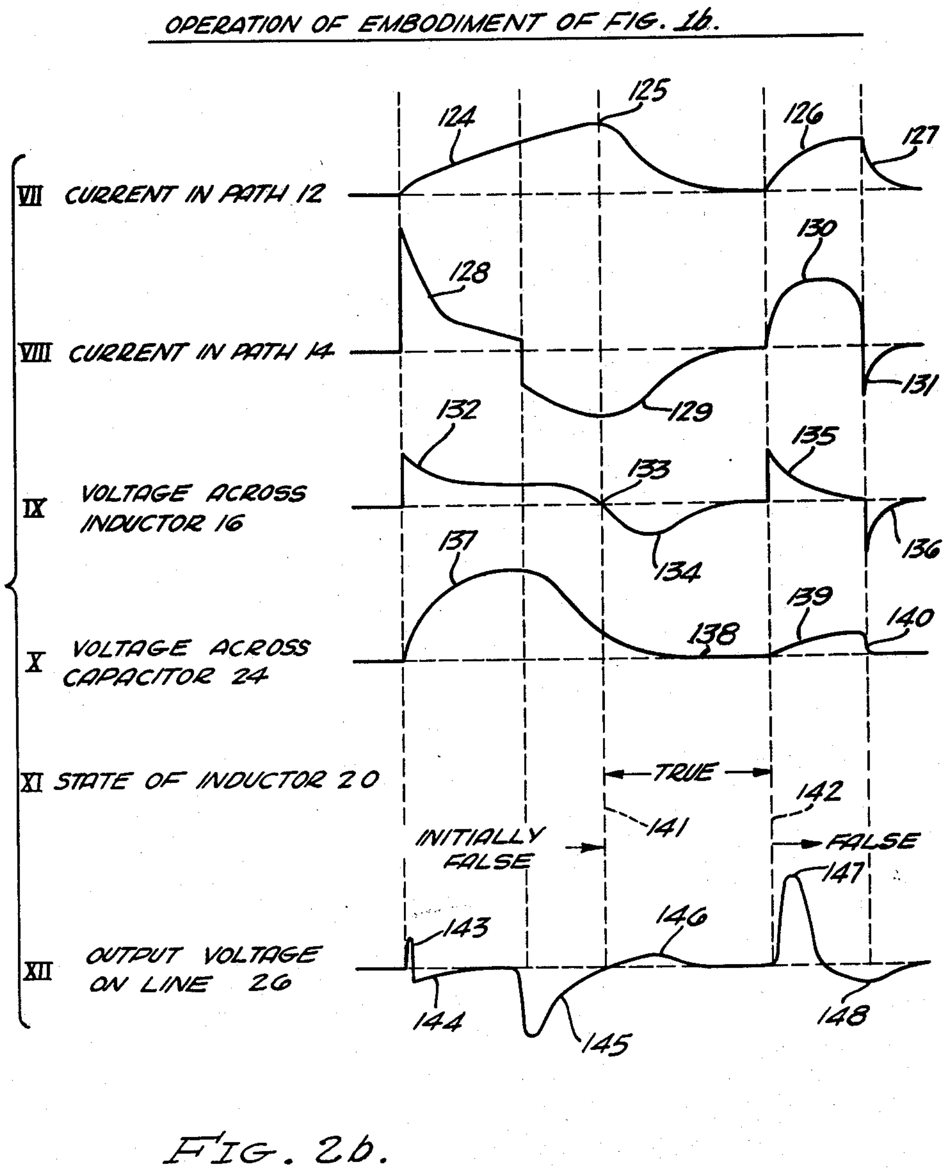

The operation of both the embodiments of the invention shown in FIGS. 1*a* and 1*b* will be better understood by reference to the waveforms shown in FIGS. 2*a* and 2*b*. An input voltage at I consisting of two square waves 101 and 102 is shown in FIG. 2*a*. The square waves 101 and 102 generate currents in path 12 of the embodiment of FIG. 1*a* during their periods as indicated at portions 103 and 104 of waveform indicated at II in FIG. 2*a*. The portions 103 and 104 are exponentially increasing currents which exponentially decay at 105 and 106, respectively, after the input voltage has dropped to zero.

Current in path 14 indicated at III in FIG. 2*a* is somewhat more peculiar. Before the leading edge of square wave 101, saturable core inductor 20 shown in FIG. 1*a* will always be saturated in a state such that current flow toward the grounded side thereof will reverse the state of its saturation. Because the saturable core inductor 20 always returns to its same state of saturation for each square wave 101 and 102, its characteristic wave shapes at 107 and 108 are identical. For this reason, the peculiarities of only wave shape 107 will be discussed in detail. At 109, current increases rather rapidly until inductor 20 is driven from one saturation state into its high inductance non-saturated state in which case the current increases only exponentially at 110. It is then further driven into its other state of saturation at 111 and current again increases rather rapidly due to its low inductance in its other saturated state.

The voltage across inductor 16 is indicated at IV. This voltage is simply the derivative of the current in path 12 indicated at II. Over a first portion 112 it is exponentially decaying corresponding to current in path 12 at 103. The voltage reverses polarity at 113 and rises to zero in portion 113 corresponding to current in path 12 at 105. During the application of second square wave 102, voltages 114 and 115 are generated which are identical with portions 112 and 113, respectively, as before.

Inductor 20 is in a state initially "false" as indicated at V. It then becomes "true" only a short period of time 116 and 117 during the application of each of the square waves 101 and 102. The state of inductor 20 becomes "true" only after it has been saturated by current flow produced directly by the trigger input.

The output voltage on line 26 indicated at VI in FIG. 2*a* initially decreases somewhat at 118 corresponding to portion 109 of current in path 14 indicated at III. Voltage on line 26 then rapidly increases to point 119 after inductor 20 has been driven into saturation. At 120 voltage on line 26 reaches a minimum negative value as inductor 20 is driven to its opposite state of saturation by inductor 16. Voltage on line 26 then rises to the maximum positive point at 121 and decays to zero. Only a portion 122 of the waveform shown at VI in FIG. 2*a* has been described in detail. As before, a second portion 123 is identical to the portion 122.

In the operation of the embodiment of FIG. 1*b*, current in path 12 increases exponentially at 124 during the application of square wave 101 as indicated at VII in FIG. 2*b*. During this time, capacitor 24 charges and is charged heavily because inductor 20 is simply driven further into its initial state of saturation and thereby has a low inductance. Thus, after capacitor 24 has been charged, current in path 12 simply increases further to a maximum value at 125 after the end of square wave 101, inductor 20 being assumed to be in an initially "false" state as indicated at XI. However, during the application of square wave 102, although current in path 12 increases at 126 it does not increase further after the end of square wave 102 but decreases very sharply at 127 because substantial charging of capacitor 24 is prevented by the voltage induced in inductor 20. This for the reason that inductor 20 is again driven to its "false" state by application of square wave 102 through a high inductance portion of its hysteresis curve. Thus, the self-induced voltage of inductor 20 opposite in polarity to that of square wave 102 prevents charging of capacitor 24 at a rate to cause inductor 20 to change states after the end of square wave 102 during a time corresponding to the flow of current in path 12 at 127.

Current in path 14 during a portion 128 thereof, corresponding to the time during which square wave 101 is applied, is simply a capacitor charging current curve.

This capacitor 24 discharges current through path 14. Assuming that a high impedance source is provided, current in path 14 during a second portion between square wave 101 and 102 at 129 will be identical to the shape of portion 125 of current in path 12 but of the opposite polarity.

During the application of square wave 102, a current at 130 in waveform VIII is produced in path 14 which is essentially inductive in view of the fact that the induced voltage in inductor 20 prevents substantial charging of capacitor 24. Current then reverses as at 131 but the reverse current is insufficient to change the saturation state of inductor 20 from the "false" state into which it is driven by the application of square wave 102 when it, prior to pulse 102, was in a "true" state as indicated at XI in FIG. 2*b*.

The voltage across inductor 16 is indicated at IX in FIG. 2*b*. During the application of square wave 101, a voltage is generated across inductor 16 which is simply an exponentially decaying voltage indicated at 132. This voltage drops to zero at 133 after the application of square wave 101. Voltage across inductor 16 reaches a maximum negative value at 134 and subsequently decreases to zero before the application of square wave 102. During the application of square wave 102, an exponentially decaying voltage at 135 is generated. Again an exponentially decaying voltage, i.e. from a negative value to zero is generated at 136 after the application of square wave 102.

The voltage across capacitor 24 is indicated at X in FIG. 2*b*. This voltage is an exponentially increasing voltage during the application of square wave 101 indicated at 137. After square wave 101, this voltage decreases to zero at 138. During the application of square wave 102, capacitor 24 charges as indicated at 139, however, the charging rate is considerably lower because of the self-induced voltage in inductor 20, inductor 20 being operated on a high permeability portion of its hysteresis curve. Capacitor 24 discharges then at 140 after the application of square wave 102, but the discharge rate is insufficient to change the saturation state of inductor 20 from the "false" state into which it is driven by the application of square wave 102.

As stated previously, it was assumed that the state of inductor 20 was initially "false." This is indicated at XI in FIG. 2*b*. The storage of energy in capacitor 24 and inductor 16 then drives it from initially "false" state to a "true" state at a point 141. The "true" state remains until the application of square wave 102 at which time 142 it is again driven into its "false" state by square wave 102.

The output voltage on line 26 during the operation of the embodiment of FIG. 1*b* is shown at XII in FIG. 2*b* where small positive and negative voltages are generated at 143 and 144 during a first portion of the application of square wave 101. Portion 143 is generated due to some finite, but relatively small self-induced voltage due to the fact that inductor 20 is driven farther into its "false" state of saturation. The current in path 14, however, is reversed; hence, a negative voltage at 144 is generated. It is to be noted that the amplitude of voltages 143 and 144 are relatively small. However, at 145, relatively large negative voltage is generated as inductor 20 is driven from its "false" state of saturation to its "true" state of saturation. As current in path 14 falls to zero, again a very small induced voltage at 146 is generated before the voltage on line 26 falls to zero.

During the application of square wave 102, a very large voltage at 147 is produced at line 26 of a positive polarity with respect to that of negative voltage 145. This is for the reason that square wave 102 directly drives inductor 20 into its "false" state of saturation. Although storage of energy in capacitor 24 is rather small and a small amount of reverse current is supplied to inductor 20 by storage of energy in capacitor 24 and inductor 16, inductor 20 is not driven back to its "true" state of saturation because of the lack of sufficient energy storage in capacitor 24 due to the relatively high self-induced voltage 145 in inductor 20 during the generation of voltage 145 on line 26. For this reason, inductor 20 is operated all this time on the low permeability portion of the hysteresis curve of FIG. 2*c* in its "false" state. Hence, although a negative voltage 148 is produced on line 26, it is small relative to the voltages 145 and 147.

From the foregoing, it can be seen from a consideration of VI of FIG. 2*a* that it is an advantage of the embodiment of FIG. 1*a* that a double frequency signal is generated at 119 and 120 each time a square wave 101 and 102 is generated. It is an unusual advantage of the embodiment of the invention shown in FIG. 1*b* that a double frequency signal is also generated because it may be separated according to the polarities of voltages at 145 and 147. Hence, the generation of a negative pulse 145 signifies that the magnetic flip-flop of the invention was initially in a "false" state and triggered to a "true" state. Similarly, the generation of a positive voltage pulse at 147 signifies that the flip-flop was initially in a "true" state and was triggered to a "false" state. Thus, if desired, the operation of a computer may be delayed until this determination is made. The information output of the magnetic flip-flop of the invention may then be used directly to operate the computer or other logical switching functions.

An ideal hysteresis characteristic of the saturable core of inductor 20 and the permeability of non-saturable core inductor 16 are shown in FIG. 2*c* where the ordinate in each case represents flux density and the abscissa represents magnetic field intensity. What heretofore has been referred as the high permeability portions of the characteristic of the core of inductor 20 is indicated at 149 in FIG. 2*c* and the low permeability portions of this curve are indicated at 150. It is to be noted that the permeability of an ideal inductor is substantially constant as indicated at the characteristic 151 in FIG. 2*c*, permeability of course being defined as the ratio of flux density to magnetic field intensity.

From the description thus far, it can be seen that the invention provides a novel arrangement wherein energy is transferred between an inductive reactance, which may be an air core inductor, and a saturable core inductor. In the pulse-shaping configuration of the invention, the core "switches" twice in response to each trigger pulse signal whereas in the bistable configuration, the storage device is introduced and the circuit characteristics are selected to insure that, without the aid of the capacitor's energy in the proper direction, a saturation change can only occur once in response to each trigger pulse signal. Thus in the bistable configuration, the storage element or capacitor effectively "remembers" the state of the saturable core and causes it to change state if it has not already changed state during the first portion of a cycle.

Figure 4:
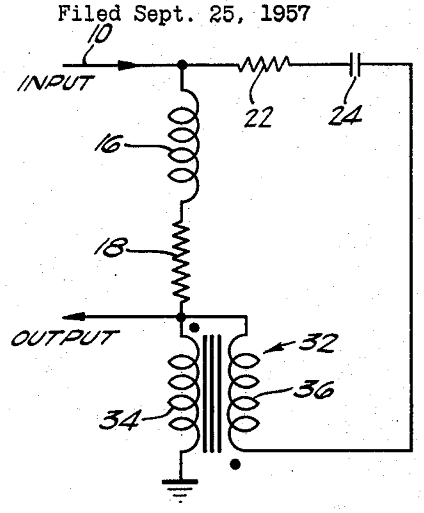
FIG. 4 is a schematic diagram of another embodiment of the flip-flop circuit shown in FIG. 1*b* utilizing a transformer having a saturable core.
Figure 3:
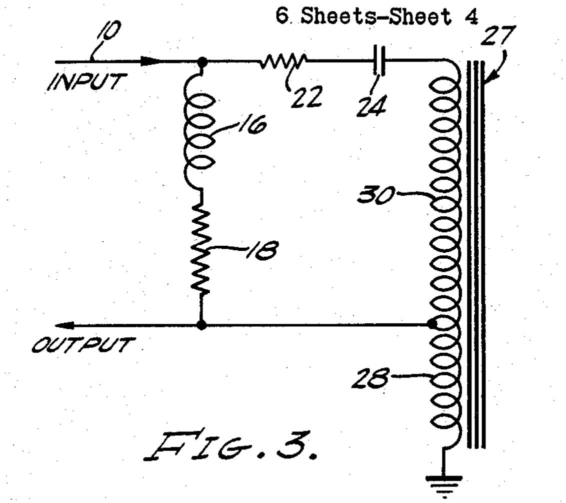
FIG. 3 is a schematic diagram of an alternative embodiment of the flip-flop circuit shown in FIG. 1*b*, utilizing an autotransformer having a saturable core.

Many other arrangements of the invention are possible utilizing different combinations of transformers for the inductive reactance, saturable core inductor, or both. In FIG. 3, autotransformer 27 has a saturable core and a tapped winding having primary section 30 and secondary section 28. In FIG. 4, transformer 32 comprises staurable core, secondary winding 34 and a primary winding 36. It is to be noted that both the embodiments of FIGS. 3 and 4 are identical as far as their electrical characteristics are concerned, the difference between the embodiments of each of FIGS. 3 and 4 being only in the manner in which windings are mechanically disposed on the saturable core of each of the saturable core transformers shown in FIGS. 3 and 4. For better coupling, it may be desirable to use the saturable core transformer 32 shown in FIG. 4. FIG 3 is employed to illustrate that further windings such as the winding 28 may be provided on the saturable core 27 to further reduce energy storage in inductor 16 and capacitor 24 when an input trigger pulse initially changes the state of saturation of the transformer 27. Thus, the induced voltage in portion 28 of the winding on the saturable core autotransformer shown in FIG. 3 will reduce the voltage applied to inductor 16 and therefore limit the energy which is stored in the magnetic field of inductor 16 and in the electrical field of capacitor 24.

In FIG. 4, voltage induced in secondary winding 34 reduces energy storage in inductor 16 and in capacitor 24 when a magnetic trigger pulse at input lead 10 is applied to change the state of saturation of the saturable core transformer 32 from "false" to "true." In both of the embodiments of FIGS. 3 and 4, the saturable core transformer is arranged to reverse the polarity of the secondary with respect to the primary so that the voltage thereof opposes that developed across inductor 16.

The transformer arrangements of FIGS. 3 and 4 operate in the same manner as the simplified circuits of FIGS. 1*a* and 1*b* in that the voltage developed across the inductor 16 opposes that developed across the secondaries 28 and 34 of the transformers 27 and 32, respectively, whenever the saturable cores are caused to change state. In this case, the storage capacitor 24, as before, does not receive any substantial energy, and, therefore, does not aid in a later reversal of state. However, where the saturable core transformers 27 and 32 are already saturated in the "zero" state and a positive pulse is applied to input terminal 10, capacitor 24 receives energy during the rising portion of the trigger input signal and then aids in the triggering of the saturable core of transformers 27 and 32 to their "one" state as previously described.

Figure 5:
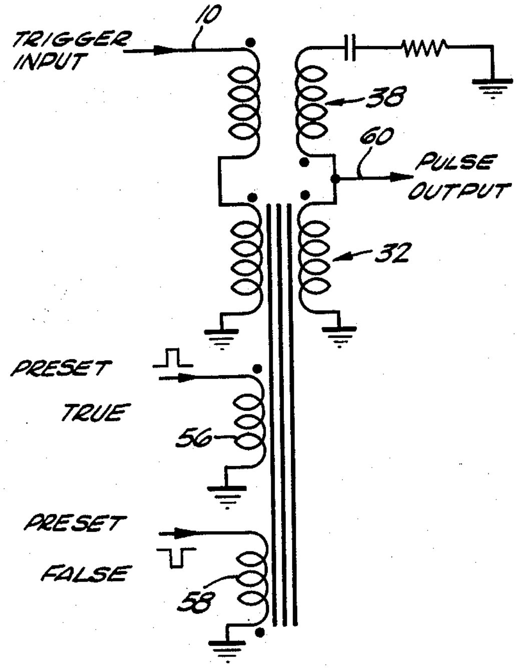
FIG. 5 is a schematic diagram of a modification of the embodiment shown in FIG. 4 with provision for preset of the saturable core inductor.

A basic double transformer arrangement is shown in FIG. 5 with the further introduction of appropriate means for setting the circuit to "0" or to "1" through separate input windings 56 and 58, respectively. It will be noted that windings 56 and 58 are arranged to provide voltages of opposite polarity corresponding to the different flux states which must be introduced into saturable transformer 32.

It may be noted at this point that the so-called trigger input signal might also be a reading signal in the sense that it may be employed to determine the state of a bistable element after it has been set. Thus the circuit of the invention may be utilized in a computer system to store logic by being set according to certain predetermined functions to either "true" or "false," which may represent the storage of the binary digits "1" or "0," respectively, and then may be employed to control other such elements by applying the trigger input signal which will produce an output pulse according to the previously stored function.

Figure 6:
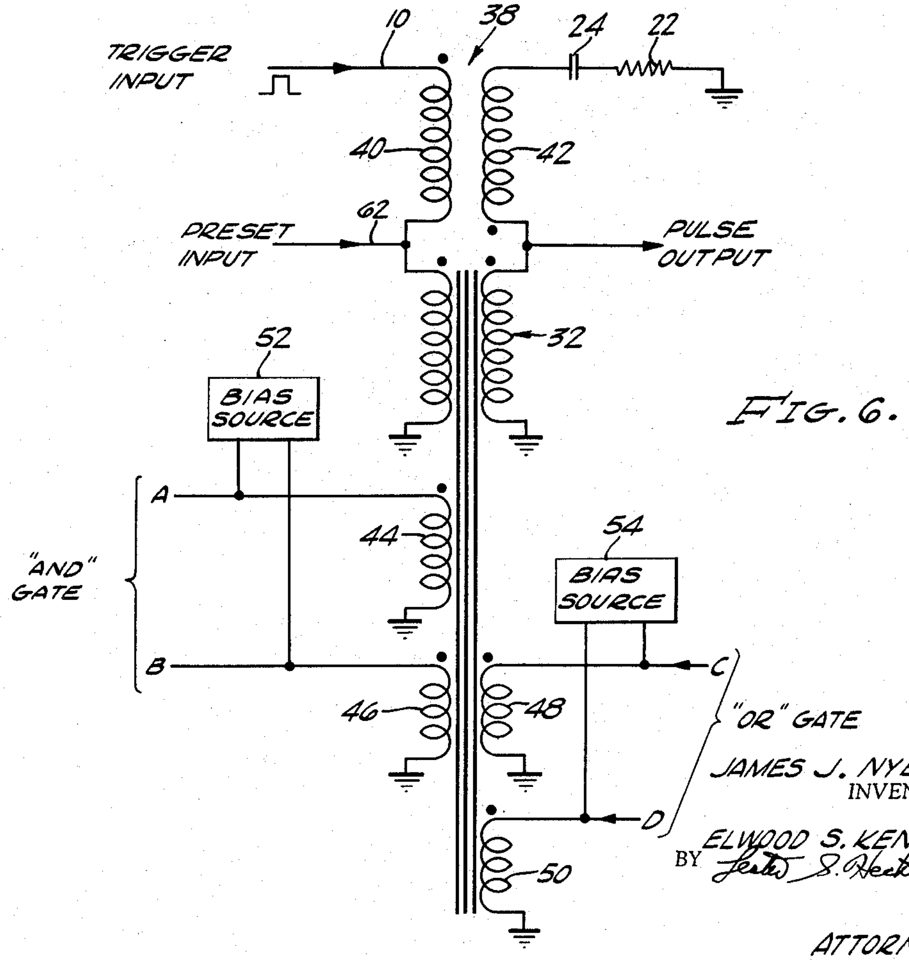
FIG. 6 is a schematic diagram of an embodiment of the invention shown in FIG. 5 with provision of saturable core windings operative as logical "and" and "or" gates.

Another arrangement of the invention is shown in FIG. 6 where two transformers are employed, one transformer 38 constituting the inductive reactance required by the invention and the second transformer 32 constituting the saturable core. Dots are indicated on the terminals of the transformers to indicate the polarity of the voltages induced thereon. In addition, FIG. 6 illustrates, in general form, the manner in which logic may be introduced directly into the bistable circuit of the invention. Thus windings 44 and 46 are adapted to receive logical input signals A and B biased by an appropriate source 52. The source is selected so that only the coincidence of signals A and B and a trigger input signal is sufficient to provide the necessary energy to trigger the circuit.

In a similar manner, "or" logic may be introduced through windings 48 and 50, appropriately biased through source 54, so that when either signal C or D or both simultaneously, is applied to its respective winding, the circuit is triggered.

In "logical" equations, the gating logic X for the magnetic trigger circuit shown in FIG. 6 may be represented as:

$$X=A.B+C+D$$

Figure 7:
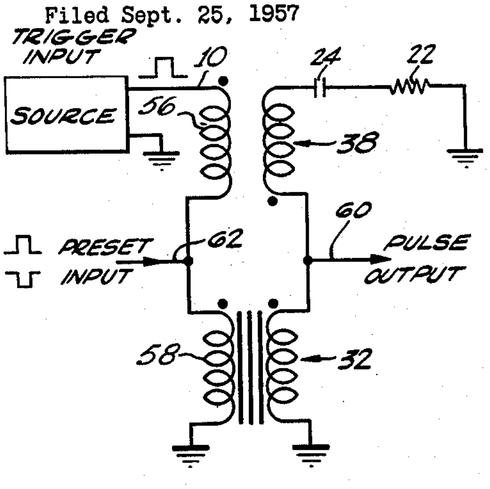
FIG. 7 is a schematic diagram of an embodiment of the invention similar to that shown in FIG. 5 but with alternate provision for presetting.

FIG. 7 illustrates an alternate manner of setting the double transformer embodiment of FIG. 6 by using pulses of appropriate polarities shown as being applied therein to input lead 10, the output signals of the circuits being derived from a lead 60.

Figure 8:
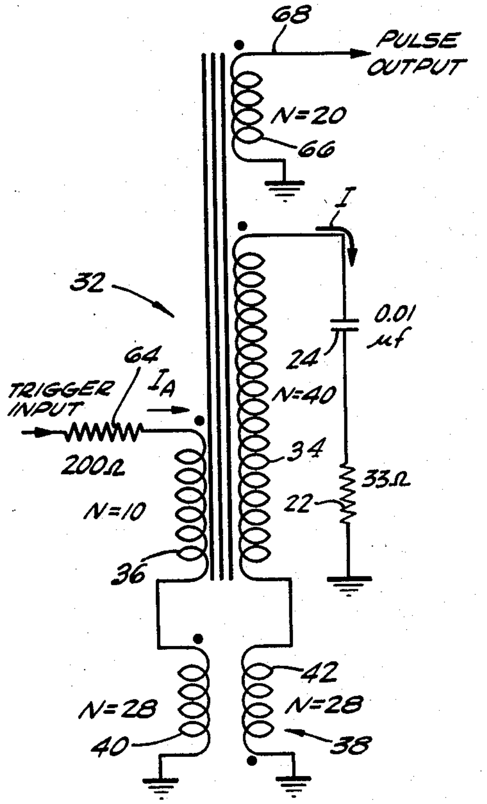
FIG. 8 is a schematic diagram of another embodiment of the invention showing typical component values which are suitable.

A detailed schematic diagram of a preferred embodiment of the invention is shown in FIG. 8 including transformers 32 and 38, capacitor 24, and a current limiting resistor 22. An input current limiting resistor 64 is also provided. A winding 66 is additionally provided on the magnetic core of transformer 32 from which an output pulse representative of the prior state of the core of transformer 32 is provided on an output lead 68.

Winding 66 is provided at the upper end of the saturable core of transformer 32 as shown in FIG. 8. Primary winding 36 is shown on the left hand side of the core at the bottom thereof in FIG. 8 and secondary 34 is shown on the right side of the core. Input resistor 64 is connected to the upper end of primary 36, the lower end of primary winding 36 being connected to the upper side of a primary winding 40 of transformer 38. The lower side of primary winding 40 is grounded. The upper side of secondary winding 34 on the saturable core is connected through capacitor 24 and resistor 22 to ground. The lower side of secondary winding 34 is connected to the upper side of secondary winding 42 of transformer 38, the lower side of secondary winding 42 being grounded. It is to be noted that, different from the connections shown in FIGS. 5, 6 and 7, the lower sides of windings 40 and 42 of transformer 38 are grounded rather than the lower sides of windings 34 and 36 on the saturable core. Electrically, this makes no difference, the embodiment of FIG. 8 illustrating that point.

Figure 9:
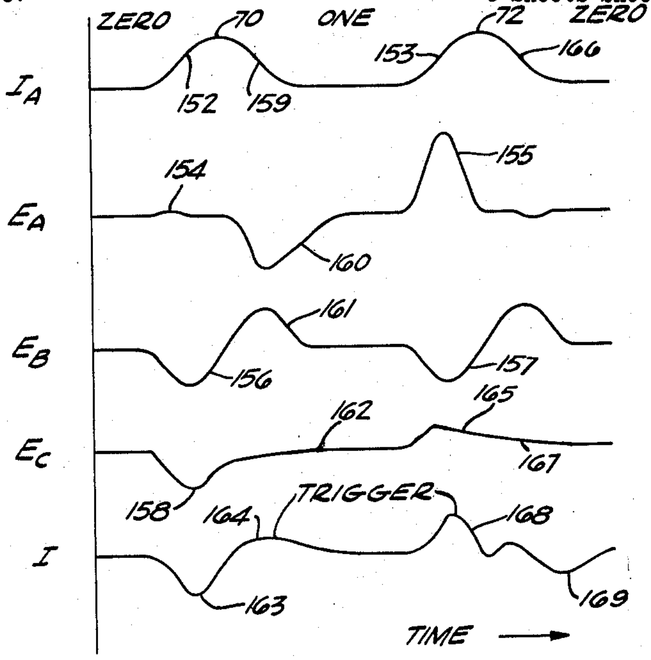
FIG. 9 shows a group of waveforms characteristic of the operation of the embodiment of the invention shown in FIG. 8.

The operation of the circuit shown in FIG. 8 may be understood from the waveforms shown in FIG. 9. Primary current is indicated at $I_A$. Two current pulses 70 and 72 are illustrated to alternately change the state of the core of transformer 32 from a binary "0" to a binary "1" and back again. The rate of change of current at the beginnings 152 and 153 of each current pulse 70 and 72, respectively, is positive. This means that during the first portion of each of the first and second current pulses 70 and 72, positive voltages $E_A$ at 154 and 155 across secondary winding 34 of transformer 32 will be generated, whereas negative voltages $E_B$ at 156 and 157 will be generated across the secondary winding 42 of transformer 38. Voltages $E_A$ and $E_B$ are always in opposition due to their particular series connection. Dot terminals of each of the secondary windings 34 and 42 may be noted specially in this regard.

Although $E_A$ will be positive at 154 and 155 during the first portions 152 and 153 of both the current pulses 70 and 72, during its saturated state going from a binary "0" to a binary "1," the induced voltage 154 in secondary 34 will be very small as compared to its induced voltage 155 when it changes states during the first portion of current pulse 72, i.e. changing from the binary "1" to the binary "0" state. Thus, during the current pulse 70, the voltage 156 generated in secondary 42 charges capacitor 24 to the value shown at 158 in voltage waveform $E_C$. During the trailing edge 159 of current pulse 70, voltages $E_A$ and $E_B$ at 160 and 161, respectively, may cancel each other to a certain extent, or, depending upon constants of the circuit, voltage $E_A$ may be somewhat larger than $E_B$. At any rate, the amplitude of $E_C$ exceeds sufficiently that of the difference between $E_A$ and $E_B$ such that the current flowing upwardly through the winding 34 causes reversal of the direction of magnetic flux saturation of the core of transformer 32. Thus, current in secondary windings 34 and 42, resistor 22 and capacitor 24 indicated at I in FIG. 9 decreases to a negative maximum value at 163 when capacitor 24 is being charged and increases to a positive maximum at 164 when the capacitor 24 discharges.

During the first half 153 of current pulse 72, $E_A$ at 155 is larger than $E_B$ at 157 and capacitor 24 is charged as indicated at 165. Thus, during the second half 166 of current pulse 72 voltage $E_C$ at 167 will be adequate to resist any tendency of $E_B$ to drive the core back to its original state of saturation.

Current I increases to a maximum value 168 during first portion 153 of current pulse 72 as the core of transformer 32 is driven into saturation directly by the current input pulse 72 rather than by discharge of capacitor 24. Current I then goes negative at 169; however, due to the fact that the induced voltage in secondary winding 34 is high, substantial charging of capacitor 24 has been prevented during the first portion 153 of current pulse 72. For this reason, capacitor 24 will discharge at a rate to produce only current 169 which is not of a sufficient amplitude to reverse the state of saturation of the saturable core.

Figure 10:
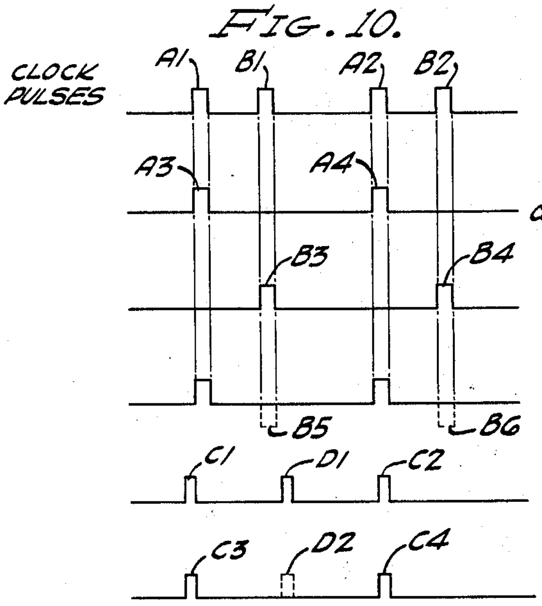
FIG. 10 shows a group of voltage pulses which may be employed to control the magnetic trigger circuit of the present invention.
Figure 11:
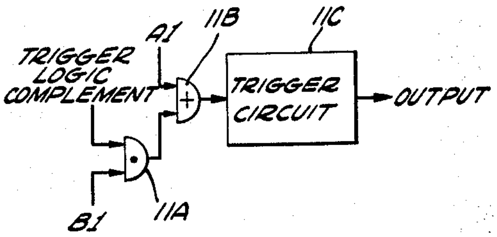
FIG. 11 is a block diagram of a logical gating arrangement for the magnetic trigger circuit of the present invention.

FIGS. 10 and 11 are illustrative computer applications of the magnetic trigger circuit of the invention. Hence, both FIGS. 10 and 11 are applicable in connection with all of the embodiments of the invention shown in the drawings with the exception of the pulse shaper embodiment shown in FIG. 1*a*.

In FIG. 10 clock pulses A1, B1 and A2, B2 are shown for pulsing the magnetic trigger circuit of the present invention. When the magnetic trigger circuit is in the "1" state, pulses A3 and A4 will be generated during corresponding clock pulses A1 and A2. If the magnetic trigger circuit is in the "0" state, pulses B3 and B4 will be generated during application of clock pulses B1 and B2, respectively. Hence, either the pulses A3 or A4 may be employed to produce an indication of the state of the trigger circuit, or alternatively, pulses B3 and B4 may be so employed. However, in view of the fact that it may be desirable to suppress a change in the state of a trigger circuit, it will generally be desirable to use the pulses A3 and A4. It is to be noted that in the "0" state, no pulse is generated; however, this condition can be easily indicated. Thus, after examining the state of a trigger circuit during the application of clock pulses A1 and A2, a corresponding one of pulses B1 and B2 may be suppressed if the trigger logic of the circuit produces a signal indicative of the fact that the saturation state of the circuit must be changed. Suppression is indicated at B5 and B6 in dotted lines in FIG. 10.

Instead of employing clock pulse pairs A1, B1 and A2, B2, still another possibility is the use of interrogation pulses C1, C2, C3 and C4 to determine the saturation state of the magnetic trigger circuit. In this event, an intermediate pulse D1 may be employed to return the trigger circuit to its original saturation state if its trigger logic so indicates. Alternatively, if a change in state is required by the trigger logic, the intermediate pulse may be suppressed as indicated in dotted lines at D2.

A sample gating arrangement utilizing "and" gate 11A and "or" gate 11B to change the state of trigger circuit 11C is shown in FIG. 11. Thus, when a condition arises when trigger circuit 11C need not be changed in state, an input is provided at the trigger logic complement input to the "and" gate 11A simultaneously with the second of the clock pulse pair A1, B1 which eventually will be passed by "or" gate 11B to return trigger circuit 11C to its original state after having been changed in state by the application of first clock pulse A1 through "or" gate 11B. Conversely, when trigger circuit 11C must be changed in state, clock pulse B1 must not be passed by "and" gate 11A through "or" gate 11B to trigger circuit 11C. This condition, is, in fact, met by the trigger logic complement input to "and" gate 11A which will be "0" when the state of saturation of trigger circuit 11C must be changed.

Although it is to be noted that bilevel signals are not used in connection with the trigger circuit 11C, a logical equation still may be written for the input to trigger circuit 11C, this equation being as follows:

$$\text{Input}=T'.B1+A1$$

where T' is the trigger logic complement.

From the foregoing description, it is apparent that the present invention provides a simple and inexpensive group of logical circuits which may be employed as pulse-shaping circuits, bistable multivibrators, or devices for storing various forms of computer logic, such as "and" or "or" functions. It should further be apparent that highly reliable operation for these purposes is possible without the necessity of using diodes, etc., to insure stability and, further, that the typical practice of the prior art in employing high-frequency alternating current is obviated.

While the invention has been specifically illustrated showing the use of particular elements such as capacitors and various types of transformers, it will be understood that the basic concept is not necessarily so limited in view of the possbility of using other types of storage elements and other variations of saturable core and inductive reactance devices. Accordingly, the true scope of the invention is defined only in the appended claims.

What is claimed is:

1. A logical circuit comprising: a saturable core reactor capable of assuming bi-stable states of magnetic remanence having primary and secondary windings; inductive reactance means having a non-saturable core and having at least a first winding electrically coupled to said secondary winding in such a manner that a change of current in said primary winding induces a voltage in said secondary winding of a polarity opposite that induced in said first winding; and a capacitor connected serially with said secondary winding and said first winding, whereby said capacitor is charge in one direction when said saturable core is in one of said bi-stable states and is charged in another direction when said saturable core is in another of said bi-stable states.

2. A magnetic trigger circuit comprising: a saturable core reactor capable of assuming bi-stable states of magnetic remanence, and primary and secondary windings on said core; inductive reactance means having a non-saturable core at its operating current and having at least a first winding electrically coupled to said secondary winding in a manner such that voltages of opposite polarities are always induced in said first winding and said secondary winding as a result of at least a change in current in said primary winding; and a capacitor connected serially with said secondary winding to complete a circuit therewith, whereby said capacitor is charged in one direction when said saturable core is in one of said bi-stable states and is charged in another direction when said saturable core is in another of said bi-stable states, and whereby pulses of the same polarity and of a sufficient amplitude applied to said primary winding and said first winding will change successively the operating point of said core on its hysteresis loop.

3. A bistable magnetic trigger circuit comprising: inductive reactance means including at least a first winding: a saturable core reactor capable of assuming bi-stable states of magnetic remanence including at least a second winding having one end coupled to one end of said first winding, said first and second windings being arranged so that opposing voltages are developed at the junction therebetween; an energy storage device coupled in current series with said second winding; and input means for coupling periodic trigger signals to said first and second windings, the energy of each of said trigger signals being sufficient to cause the saturation of said reactor in a first direction, while said opposing voltages prevent substantial transfer of energy to said storage device, and including means for providing a substantially direct current signal between trigger signals to permit passage of the energy stored in said storage device through said second winding, said storage device being selected to develop sufficient energy in response to a trigger signal, when said reactor is saturated in said first direction, to cause a reversal of the saturation direction of said reactor to its second direction.

4. The trigger circuit defined in claim 3 wherein said first winding constitutes the secondary of a first transformer, and wherein said second winding constitutes the secondary of a second transformer, said input means being connected to one end of the primary of said first transformer, and the other end of the primary of said first transformer being connected to the primary of said second transformer.

5. The trigger circuit in claim 3 wherein said first winding constitutes the secondary of a first transformer, and wherein said second winding constitutes the secondary of a second transformer, said input means being connected to one end of the primary of said second transformer, and the other end of the primary of said second transformer being connected to the primary of said first transformer.

6. A magnetic trigger circuit comprising: first and second transformers each having primary and secondary windings, said first transformer being constructed to operate without any substantial saturation for a selected primary current, said second transformer being constructed with a core of magnetic material selected to operate as a saturable reactor capable of assuming bi-stable states of magnetic remanence, said secondary windings being connected to form a secondary circuit such that opposing voltages are induced in said secondary windings by current flow in said primary windings; a capacitor coupled serially with said secondary windings; and input means for causing saturation of said core in a first direction while inducing said opposing voltages to limit the energy received by said capacitor to a relatively small amount, and for transferring substantial energy to said capacitor when said core is already saturated in said first direction, said capacitor being selected to receive sufficient energy thereby to change the saturation state of said core to its second direction upon discharge.

7. The invention as defined in claim 6, wherein at least two additional windings are located on said core and a direct-current bias source is coupled with one of said additional windings to prevent a change in the saturation state of said core except on the application of direct-current signals to at least one of said additional windings.

8. The invention as defined in claim 6, wherein at least two additional windings are provided on said core and a direct-current bias source is coupled with one of said additional windings to prevent a change in the saturation state of said core except on the application of direct-current signals to both of said additional windings simultaneously.

9. The invention as defined in claim 6, wherein two additional windings are provided on said core, each of said additional windings being connected to a predetermined point of reference potential at one end and being adapted to receive direct-current pulses of the same polarity to change the state of saturation of said core selectively.

10. The invention as defined in claim 6, wherein the following are additionally provided: a source of direct-current pulses connected to one side of the primary winding of said first transformer; and means to apply positive and negative pulses to the junction of said primary windings selectively to change the state of saturation of said core.

References Cited in the file of this patent

UNITED STATES PATENTS

| | | |
|---|---|---|
| 2,723,354 | Isborn | Nov. 8, 1955 |
| 2,778,955 | Isborn | Jan. 22, 1957 |
| 2,797,339 | Steagall | June 25, 1957 |
| 2,869,004 | Melville | Jan. 13, 1959 |
| 2,883,563 | Sunderlin | Apr. 21, 1959 |
| 2,907,006 | Eckert | Sept. 29, 1959 |
| 2,926,298 | Newhouse | Feb. 23, 1960 |
| 2,926,339 | Kramer et al. | Feb. 23, 1960 |
| 2,946,047 | Morgan | July 19, 1960 |
| 3,056,038 | Benmussa et al. | Sept. 25, 1962 |

FOREIGN PATENTS

| | | |
|---|---|---|
| 216,131 | Australia | June 20, 1957 |